US008117390B2

(12) United States Patent
Cummings et al.

(10) Patent No.: US 8,117,390 B2
(45) Date of Patent: Feb. 14, 2012

(54) UPDATING PARTIAL CACHE LINES IN A DATA PROCESSING SYSTEM

(75) Inventors: David W. Cummings, Round Rock, TX (US); Guy L. Guthrie, Austin, TX (US); Hugh Shen, Round Rock, TX (US); William J. Starke, Round Rock, TX (US); Derek E. Williams, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 12/424,434

(22) Filed: Apr. 15, 2009

(65) Prior Publication Data
US 2010/0268884 A1    Oct. 21, 2010

(51) Int. Cl.
*G06F 13/00* (2006.01)
(52) U.S. Cl. .................... 711/118; 711/119; 711/141
(58) Field of Classification Search .............. 711/118, 711/119, 141, 137, 154
See application file for complete search history.

(56) References Cited

U.S. PATENT DOCUMENTS

| | | | |
|---|---|---|---|
| 4,694,395 A | 9/1987 | Young et al. | |
| 5,210,842 A | 5/1993 | Sood | |
| 5,276,850 A | 1/1994 | Sakaue | |
| 5,418,916 A * | 5/1995 | Hall et al. | 712/228 |
| 5,555,391 A | 9/1996 | De Subijana et al. | |
| 5,778,438 A * | 7/1998 | Merchant | 711/146 |
| 5,802,572 A | 9/1998 | Patel et al. | |
| 5,893,147 A | 4/1999 | Deng | |
| 5,893,151 A | 4/1999 | Merchant | |
| 5,926,829 A | 7/1999 | Hagersten et al. | |
| 6,058,456 A | 5/2000 | Arimilli et al. | |
| 6,122,729 A | 9/2000 | Tran | |
| 6,131,145 A | 10/2000 | Matsubara et al. | |
| 6,195,735 B1 | 2/2001 | Krueger et al. | |
| 6,199,107 B1 | 3/2001 | Dujari | |
| 6,216,219 B1 | 4/2001 | Cai et al. | |
| 6,321,306 B1 | 11/2001 | Arimilli et al. | |
| 6,345,341 B1 | 2/2002 | Arimilli et al. | |
| 6,345,342 B1 | 2/2002 | Arimilli et al. | |

(Continued)

OTHER PUBLICATIONS

L.B. Arimilli—Office Action dated Jan. 12, 2011; U.S. Appl. No. 12/024,392.

(Continued)

*Primary Examiner* — Vu Le
(74) *Attorney, Agent, or Firm* — Yudell Isidore Ng Russell PLLC

(57) ABSTRACT

A processing unit for a data processing system includes a processor core having one or more execution units for processing instructions and a register file for storing data accessed in processing of the instructions. The processing unit also includes a multi-level cache hierarchy coupled to and supporting the processor core. The multi-level cache hierarchy includes at least one upper level of cache memory having a lower access latency and at least one lower level of cache memory having a higher access latency. The lower level of cache memory, responsive to receipt of a memory access request that hits only a partial cache line in the lower level cache memory, sources the partial cache line to the at least one upper level cache memory to service the memory access request. The at least one upper level cache memory services the memory access request without caching the partial cache line.

17 Claims, 8 Drawing Sheets

U.S. PATENT DOCUMENTS

| | | |
|---|---|---|
| 6,353,877 B1 | 3/2002 | Duncan et al. |
| 6,356,980 B1 | 3/2002 | Arimilli et al. |
| 6,360,297 B1 | 3/2002 | Arimilli et al. |
| 6,446,167 B1 | 9/2002 | Mayfield et al. |
| 6,460,115 B1 | 10/2002 | Kahle et al. |
| 6,470,427 B1 | 10/2002 | Arimilli et al. |
| 6,499,085 B2 | 12/2002 | Bogin et al. |
| 6,557,080 B1 | 4/2003 | Burger et al. |
| 6,564,302 B1 | 5/2003 | Yagi et al. |
| 6,571,319 B2 | 5/2003 | Tremblay et al. |
| 6,571,322 B2 | 5/2003 | Arimilli et al. |
| 6,615,321 B2 | 9/2003 | Arimilli et al. |
| 6,643,744 B1 | 11/2003 | Cheng |
| 6,647,466 B2 | 11/2003 | Steely, Jr. |
| 6,681,296 B2 | 1/2004 | Liao et al. |
| 6,704,860 B1 | 3/2004 | Moore |
| 6,763,433 B1 | 7/2004 | Arimilli et al. |
| 6,763,434 B2 | 7/2004 | Arimilli et al. |
| 6,772,288 B1 | 8/2004 | Flake et al. |
| 6,785,772 B2 | 8/2004 | Venkumahanti et al. |
| 6,823,447 B2 | 11/2004 | Hay et al. |
| 6,848,071 B2 | 1/2005 | Chaudhry et al. |
| 6,957,305 B2 | 10/2005 | Ray et al. |
| 6,971,000 B1 | 11/2005 | Sinharoy et al. |
| 6,978,351 B2 | 12/2005 | Osborne et al. |
| 7,028,159 B2 | 4/2006 | Matsubara et al. |
| 7,062,609 B1 | 6/2006 | Trehus et al. |
| 7,065,548 B2 | 6/2006 | Van Oldenborgh et al. |
| 7,234,040 B2 | 6/2007 | Berg et al. |
| 7,237,068 B2 | 6/2007 | Wallin et al. |
| 7,350,032 B2 | 3/2008 | Stenstrom |
| 7,380,047 B2 | 5/2008 | Emma et al. |
| 7,533,242 B1 | 5/2009 | Moll et al. |
| 7,600,143 B1 | 10/2009 | Neuman |
| 7,958,309 B2 | 6/2011 | Arimilli et al. |
| 2002/0087801 A1 | 7/2002 | Bogin et al. |
| 2002/0087809 A1 | 7/2002 | Arimilli et al. |
| 2002/0092029 A1 | 7/2002 | Smith |
| 2002/0112124 A1* | 8/2002 | Arimilli et al. ............... 711/122 |
| 2002/0133674 A1 | 9/2002 | Martin et al. |
| 2002/0138698 A1 | 9/2002 | Kalla |
| 2002/0174253 A1 | 11/2002 | Hayter et al. |
| 2003/0046356 A1 | 3/2003 | Alvarex et al. |
| 2003/0084250 A1 | 5/2003 | Gaither et al. |
| 2003/0110117 A1 | 6/2003 | Saidenberg et al. |
| 2003/0159005 A1 | 8/2003 | Augsburg et al. |
| 2003/0177320 A1 | 9/2003 | Sah et al. |
| 2003/0208665 A1 | 11/2003 | Peir et al. |
| 2004/0037276 A1 | 2/2004 | Henderson et al. |
| 2004/0039879 A1 | 2/2004 | Gaither |
| 2004/0049615 A1 | 3/2004 | Liang |
| 2004/0117510 A1 | 6/2004 | Arimilli et al. |
| 2004/0205298 A1 | 10/2004 | Bearden et al. |
| 2004/0260879 A1* | 12/2004 | Barroso et al. ............... 711/122 |
| 2004/0268051 A1 | 12/2004 | Berg et al. |
| 2005/0027911 A1 | 2/2005 | Hayter et al. |
| 2005/0053057 A1 | 3/2005 | Deneroff et al. |
| 2005/0080994 A1 | 4/2005 | Cohen et al. |
| 2005/0204113 A1 | 9/2005 | Harper et al. |
| 2005/0210203 A1 | 9/2005 | Stenstrom |
| 2005/0240729 A1 | 10/2005 | Van Berkel et al. |
| 2005/0240736 A1 | 10/2005 | Shaw |
| 2006/0080511 A1 | 4/2006 | Hoover et al. |
| 2006/0085600 A1 | 4/2006 | Miyashita et al. |
| 2006/0173851 A1 | 8/2006 | Singh et al. |
| 2006/0174228 A1 | 8/2006 | Radhakrishnan et al. |
| 2006/0179239 A1 | 8/2006 | Fluhr et al. |
| 2006/0179254 A1 | 8/2006 | Clark et al. |
| 2006/0184607 A1 | 8/2006 | Le Leannec et al. |
| 2006/0184746 A1 | 8/2006 | Guthrie et al. |
| 2006/0184772 A1 | 8/2006 | Dooley et al. |
| 2006/0212648 A1 | 9/2006 | Cox et al. |
| 2006/0251092 A1 | 11/2006 | Matterne et al. |
| 2006/0259707 A1 | 11/2006 | Freytag |
| 2006/0265552 A1 | 11/2006 | David et al. |
| 2007/0038846 A1 | 2/2007 | Kadambi et al. |
| 2007/0050592 A1 | 3/2007 | Gschwind et al. |
| 2007/0058531 A1 | 3/2007 | Dierks et al. |
| 2007/0079073 A1 | 4/2007 | Rosenbluth et al. |
| 2007/0083716 A1 | 4/2007 | Rajamony et al. |
| 2007/0088919 A1 | 4/2007 | Shen et al. |
| 2007/0094450 A1 | 4/2007 | Vanderwiel |
| 2007/0136374 A1 | 6/2007 | Guedalia |
| 2007/0168619 A1 | 7/2007 | Hutton et al. |
| 2007/0214335 A1 | 9/2007 | Bellows et al. |
| 2007/0220208 A1 | 9/2007 | Nomura et al. |
| 2007/0294264 A1 | 12/2007 | Bayardo, Jr. et al. |
| 2008/0056051 A1 | 3/2008 | Mayer et al. |
| 2008/0086602 A1 | 4/2008 | Guthrie et al. |
| 2008/0104330 A1 | 5/2008 | Deshpanda |
| 2008/0183972 A1 | 7/2008 | Dieffenderfer |
| 2008/0244185 A1 | 10/2008 | O'Krafka et al. |
| 2008/0256303 A1 | 10/2008 | Croxford et al. |
| 2009/0198865 A1 | 8/2009 | Arimilli et al. |
| 2009/0198912 A1 | 8/2009 | Arimilli et al. |
| 2009/0198914 A1 | 8/2009 | Arimilli et al. |
| 2009/0198960 A1 | 8/2009 | Arimilli et al. |

OTHER PUBLICATIONS

L.B. Arimilli—Office Action dated Jan. 10, 2011; U.S. Appl. No. 12/024,432.

Ravi K. Arimilli—Office Action dated Jan. 20, 2011; U.S. Appl. No. 12/024,174.

L.B. Arimilli—Office Action dated Feb. 7, 2011; U.S. Appl. No. 12/024,467.

U.S. Appl. No. 12/024,170,"Varying an Amount of Data Retrieved from Memory Based upon an Instruction Hint," Non-Final Office Action dated Dec. 22, 2010.

U.S. Appl. No. 12/024,170,"Varying an Amount of Data Retrieved from Memory Based upon an Instruction Hint," Final Office Action dated May 27, 2011.

U.S. Appl. No. 12/024,165, "Method and System for Sourcing Differing Amounts of Prefetch Data in Response to Data Prefetch Requests," Non-Final Office Action dated Nov. 16, 2010.

U.S. Appl. No. 12/024165, "Method and System for Sourcing Differing Amounts of Prefetch Data in Response to Data Prefetch Requests," Final Office Action dated Apr. 27, 2011.

Guo et al.;"Cooperative Caching for Peer Assisted Video Distribution"; Advances in Multimedia Modeling, 13th International Multimedia Modeling Conference; MMM 2007; Lecture Notes in Computer Science; vol. 4351; pp. 135-144.

Emma et al.; "Partial Store Lines in Store in Caches"; IBM TDB; p. 4240; Dec. 1984.

J. Hoogerbrugge; "Cost Effiecient Branch Target Buffers" Euro-Par 2004 Parallel Processing; 10th International Euro-Par Conference; Lecture Notes in Computer Science; vol. 1900; pp. 950-959; Aug.-Sep. 2000.

Parmentier et al.; "Cache Based Parallelization of Multiple Sequence Alignment Problem"; Euro-Par Parallel Processing; 10th International Euro-Par Conference; Lecture Notes in Computer Science; vol. 3149; pp. 950-959, Sep. 2011.

U.S. Appl. No. 12/024,392, "Claiming Coherency Ownership of a Partial Cache Line of Data," Non-Final Office Action dated Jun. 13, 2011.

U.S. Appl. No. 12/024424, "Data Processing System, Processor and Method that Perform a Partial Cache Line Storage-Modifying Operation Based upon a Hint," Non-Final Office Action dated Sep. 28, 2010.

U.S. Appl. No. 12/024,424, "Data Processing System, Processor and Method that Perform a Partial Cache Line Storage-Modifying Operation Based upon a Hint," Non-Final Office Action dated Aug. 12, 2011.

U.S. Appl. No. 12/024,447, "Data Processing System, Processor and Method for Implementing Cache Management for Partial Cache Line Operations," Non-Final Office Action dated Sep. 28, 2010.

U.S. Appl. No. 12/024,447, "Data Processing System, Processor and Method for Implementing Cache Management for Partial Cache Line Operations," Notice of Allowance dated Aug. 19, 2011.

U.S. Appl. No. 12/024,174, "Touch of a Partial Cache Line of Data," Final Office Action dated Jul. 1, 2011.

U.S. Appl. No. 12/024,467, "Interconnect Operation Indicating Acceptability of Partial Data Delivery," Non-Final Office Action dated Oct. 13, 2010.

U.S. Appl. No. 12/024,467, "Interconnect Operation Indicating Acceptability of Partial Data Delivery," Non-Final Office Action dated May 17, 2011.

U.S. Appl. No. 12/024,432, "Partial Cache Line Accesses Based on Memory Access Patterns," Non-Final Office Action dated Sep. 24, 2010.

U.S. Appl. No. 12/024,432, "Partial Cache Line Accesses Based on Memory Access Patterns," Notice of Allowance dated May 16, 2011.

US Patent No. 7958309, "Dynamic Selection of a Memory Access Size," Non-Final Office Action dated Oct. 20, 2010.

US Patent No. 7958309, "Dynamic Selection of a Memory Access Size," Notice of Allowance dated Jan. 31, 2011.

U.S. Appl. No. 12/424,716, "Specifying an Access Hint for Prefetching Partial Cache Block Data in a Cache Hierarchy," Non-Final Office Action dated Aug. 31, 2011.

Sheu et al.; "The Selection of Optimal Cache Lines for Microprocessor Based Controllers"; Proceedings of the 23rd Annual Workshop and Symposium on Microprogramming and Micro-Architecture MICRO 23, Nov. 1990.

Milenkovic et al.; "Compiler and Runtime Hints for Memory Management"; IBM TDB n8b, pp. 76-77, Jan. 1990.

Song; "Methods of Specifying Data Pre-Fetching Without Using a Separate Instruction"; IBM TDB vol. 38, No. 6, pp. 355-356, Jun. 1995.

Hazim; "System and Method to Improve Hardware Pre-Fetching Using Translation Hints"; Oct. 2004.

Wang; "Cooperative Hardware/Software Caching for Next Generation Memory Systems"; vol. 6501B of Dissertations Abstracts International, 2004.

Funk et al.; "Instruction Cache Block Retro-Fitted onto Microprocessor"; IBM TDB vol. 28, No. 7, pp. 53-56, Jul. 1995.

Van Peursem; "A New Hardware Pre-Fetching Scheme Based on Dynamic Interpretation of the Instruction Stream Cache"; vol. 5509B of Dissertations Abstracts International, 1994.

Duncan et al.; High Performance I/O Design in the Alphaserver 4100 Symmetric Multi-Processing System, Digital Technical Journal, vol. 8, No. 4, pp. 61-75, 1996.

Tian et al.; "A Unified Compressed Cache Hierarchy Using Simple Frequent pattern Compression and Partial Cache Line Pre-Fetching"; Embedded Software and Systems, Third International Conference, ICESS 2007, May 2007.

Hwang et al.; "Delayed Precise Invalidation a Software Cache Coherence Scheme"; IEEE Proceeding Computer and Digital Techniques; vol. 143, No. 5, pp. 337-344; Sep. 1996.

Gilbert et al.;"Distributed Data Cache Designs for Clustered VLIW Processors"; IEEE Transactions on Computers; vol. 54, No. 10, pp. 1227-1241; Oct. 2005.

* cited by examiner

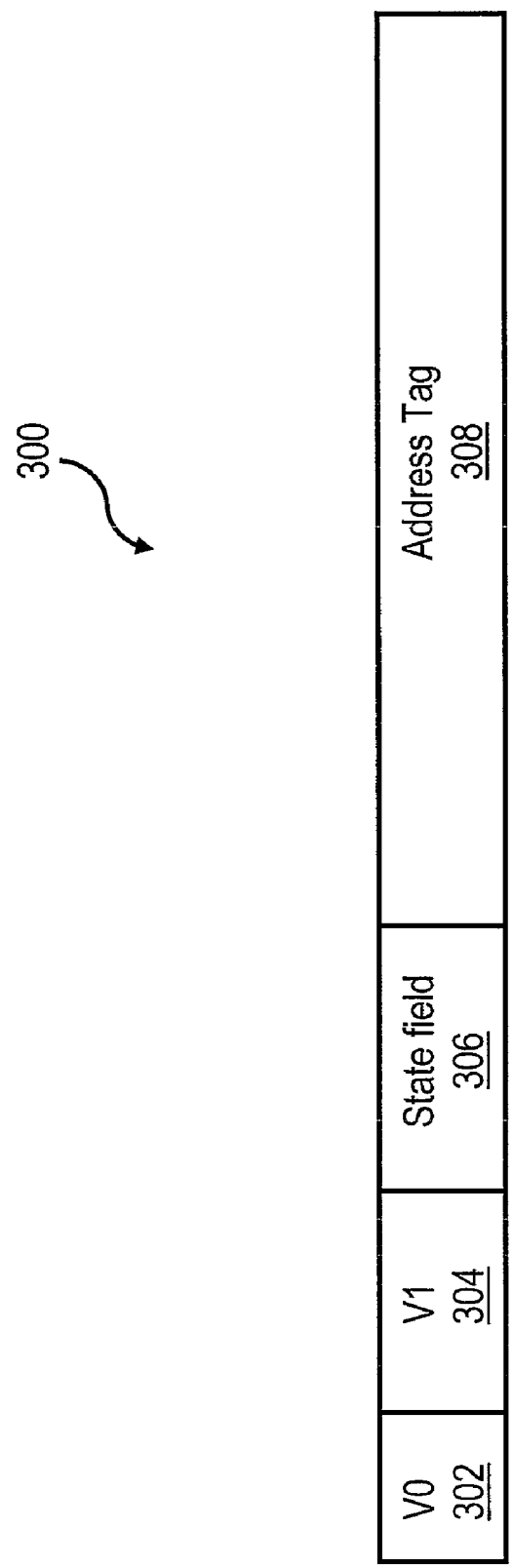

UPDATING PARTIAL CACHE LINES IN A DATA PROCESSING SYSTEM

This invention was made with United States Government support under Agreement No. HR0011-07-9-0002 awarded by DARPA. THE GOVERNMENT HAS CERTAIN RIGHTS IN THE INVENTION.

BACKGROUND OF THE INVENTION

1. Technical Field

The present invention relates generally to data processing and, in particular, to handling updates to partial cache lines in a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of processor-addressable memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer cache lines that might be accessed by a processor in order to speed up processing by reducing access latency introduced by having to load needed data and instructions from memory. In some multiprocessor (MP) systems, the cache hierarchy includes at least two levels. The level one (L1), or upper-level cache is usually a private cache associated with a particular processor core and cannot be directly accessed by other cores in an MP system. Typically, in response to a memory access instruction such as a load or store instruction, the processor core first accesses the directory of the upper-level cache. If the requested cache line is not found in the upper-level cache, the processor core then accesses one or more lower-level caches (e.g., level two (L2) or level three (L3) caches) for the requested cache line.

With some workloads, updates are performed to scattered locations in memory. To perform each such update, a conventional cache hierarchy retrieves a full cache line of data from system memory and populates one or more levels of cache with the cache line. It is recognized herein that it is wasteful and inefficient to retrieve the entire cache line when an update will only be made to a small portion of the cache. In addition, placing the line in the cache is also wasteful since that line is unlikely to be accessed again in the near future in such workloads.

SUMMARY OF THE INVENTION

According to one embodiment, a processing unit for a data processing system includes a processor core having one or more execution units for processing instructions and a register file for storing data accessed in processing Of the instructions. The processing unit also includes a multi-level cache hierarchy coupled to and supporting the processor core. The multi-level cache hierarchy includes at least one upper level of cache memory having a lower access latency and at least one lower level of cache memory having a higher access latency. The lower level of cache memory, responsive to receipt of a memory access request that hits only a partial cache line in the lower level cache memory, sources the partial cache line to the at least one upper level cache memory to service the memory access request. The at least one upper level cache memory services the memory access request without caching the partial cache line.

BRIEF DESCRIPTION OF THE DRAWINGS

FIG. 3 illustrates an exemplary format of one of the directory entries in the L3 directory of FIG. 2B;

DETAILED DESCRIPTION OF ILLUSTRATIVE EMBODIMENT(S)

Figure 1:
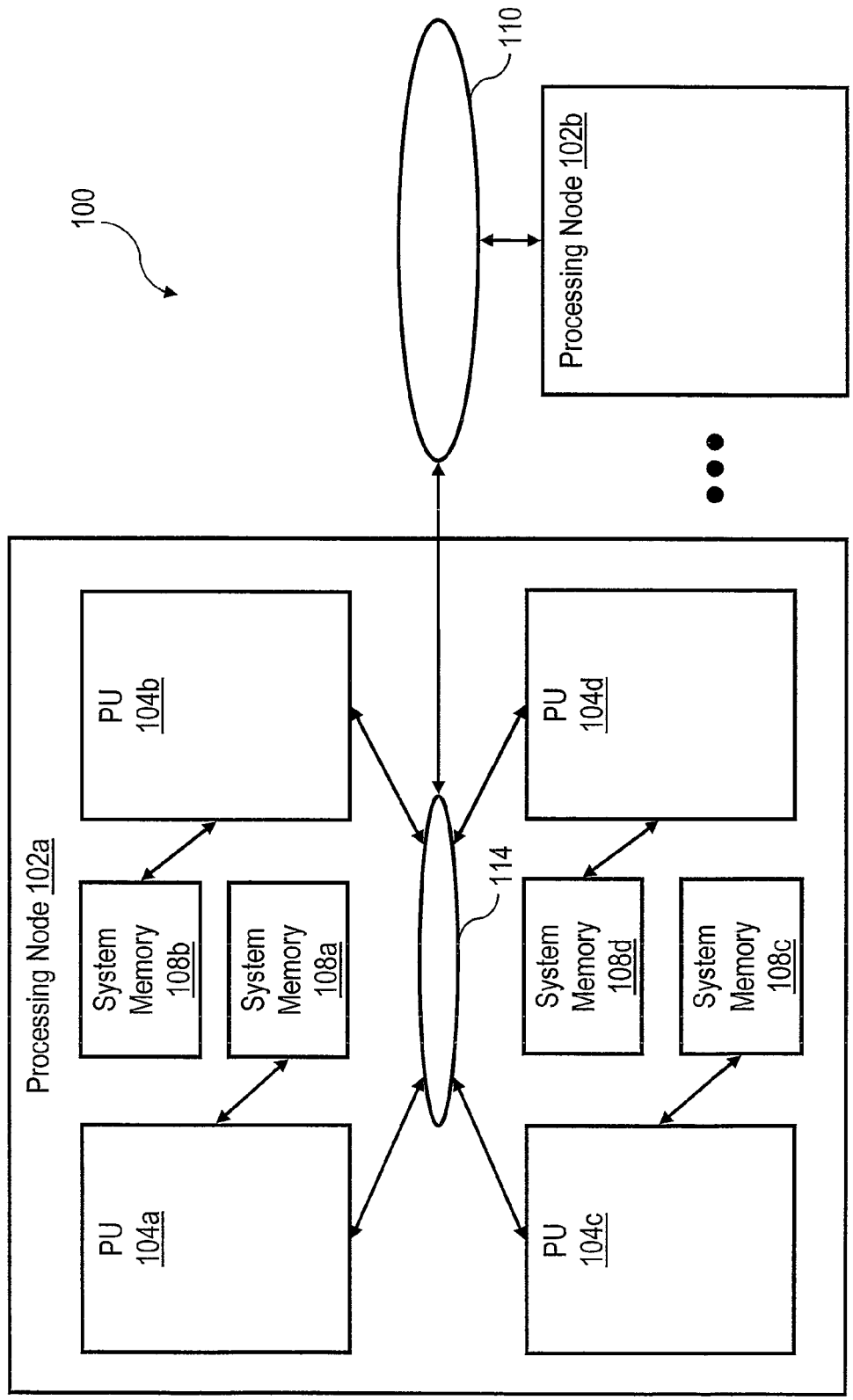
FIG. 1 is a high level block diagram of an exemplary embodiment of a multiprocessor data processing system in accordance with one embodiment.

With reference now to the figures and, in particular, with reference to FIG. 1, there is illustrated a high level block diagram of an exemplary embodiment of a multiprocessor data processing system. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches. Local interconnects 114 and system interconnect 110 together form an interconnect fabric, which preferably supports concurrent communication of operations of differing broadcast scopes. For example, the interconnect fabric preferably supports concurrent communication of operations limited in scope to a single processing node 102 and operations broadcast to multiple processing nodes 102.

The devices coupled to each local interconnect 114 include not only processing units 104, but also one or more system memories 108a-108d. Data and instructions residing in system memories 108 can generally be accessed and modified by a processor core (FIG. 2A) in any processing unit 104 in any processing node 102 of data processing system 100. In alternative embodiments of the invention, one or more system memories 108 can be coupled to system interconnect 110 rather than a local interconnect 114.

Those skilled in the art will appreciate that data processing system 100 can include many additional unillustrated components, such as peripheral devices, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2A:
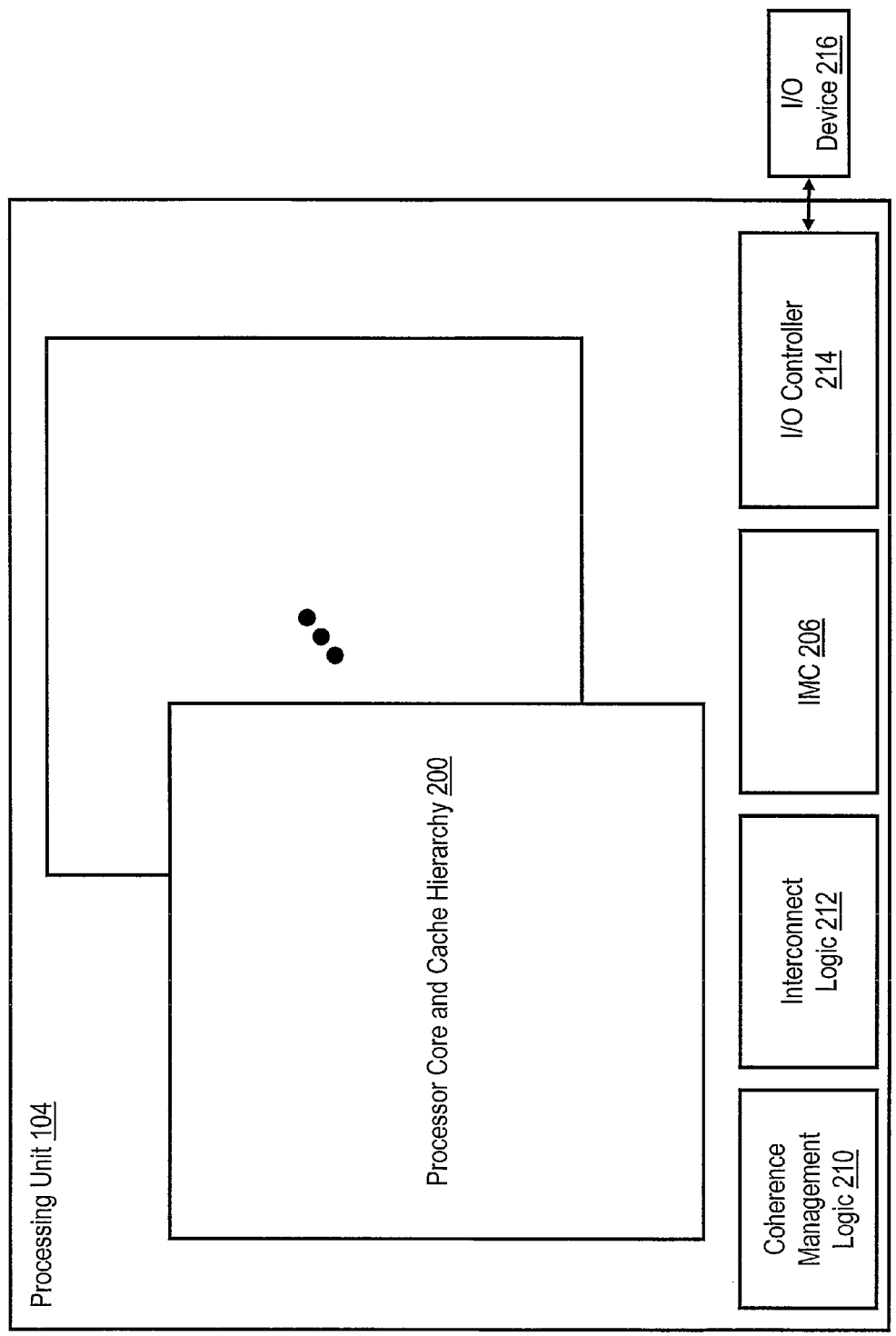
FIG. 2A is a more detailed block diagram of an exemplary processing unit of the data processing system of FIG. 1 in accordance with one embodiment.

Referring now to FIG. 2A, there is depicted a more detailed block diagram of an exemplary processing unit 104 in accordance with one embodiment. In the depicted embodiment, each processing unit 104 includes multiple instances of a processor core and associated cache hierarchy, which are collectively identified by reference numeral 200. In the depicted embodiment, each processing unit 104 also includes an integrated memory controller (IMC) 206 that controls read and write access to one or more of the system memories 108a-108d within its processing node 102 in response to requests received from processor cores and operations snooped on the local interconnect 114.

Each processing unit 104 also includes an instance of coherence management logic 210, which implements a portion of the distributed snoop-based coherency signaling mechanism that maintains cache coherency within data processing system 100. In general, coherence management logic 210 receives partial responses provided by each participant in a interconnect operation (e.g., cache memories and IMCs 206) that snoops a request on the interconnect fabric and compiles the partial responses to determine an overall systemwide coherence response (a "a combined response") for the request. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 2B:
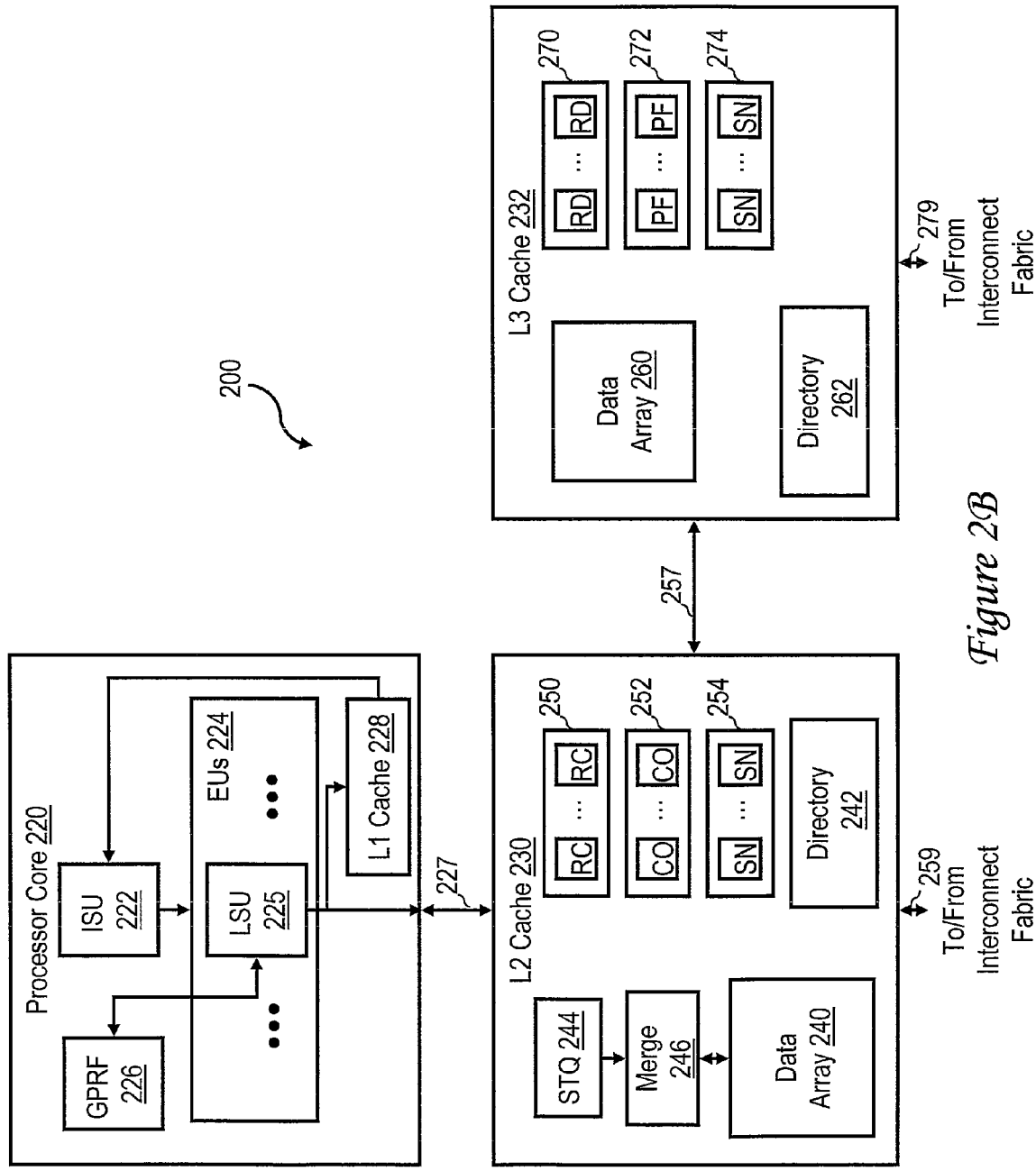
FIG. 2B is a more detailed block diagram of an exemplary embodiment of a processor core and associated cache hierarchy from FIG. 2A.

With reference now to FIG. 2B is a more detailed block diagram of an exemplary embodiment of a processor core and associated cache hierarchy 200 from FIG. 2A. As illustrated, a processor core 220 includes an instruction sequencing unit 222 that obtains and orders instructions for execution by one or more execution units 224. In a superscalar embodiment such as that illustrated, the EUs 224 may include one or more execution units for executing arithmetic and logic operations, as well as a load-store unit (LSU) 226 that executes memory access instructions, including load-type instructions that load data from memory into a general purpose register file (GPRF) 228 and store-type instructions that store data from GPRF 228 into memory. GPRF 228 thus holds the working data set of processor core 220, and LSU 225 is utilized to move the data set to and from memory.

To provide low access latency to the data set of processor core 220, processor core 220 is supported by cache memory. In one exemplary embodiment, the cache memory is arranged in a multi-level hierarchy including a store-through level one (L1) cache 228 within processor core 220, a store-in level two (L2) cache 230, and a L3 cache 232. In some embodiments, L3 cache 232 is utilized as a victim cache for L2 cache 230 and accordingly is filled by cache lines evicted from L2 cache 230. In some embodiments, the contents of L3 cache 232 are not exclusive of the contents of L2 cache 230, meaning that a given cache line may be held concurrently in L2 cache 230 and L3 cache 232. In order to decrease average access latency, LSU 225 may also execute prefetch instruction that causes data likely to be accessed by processor core 220 to be preloaded in the cache memory hierarchy of processor core 220 in advance of a demand access.

Although hereafter it will be assumed that the cache hierarchy includes only three levels of cache, those skilled in the art will appreciate that alternative embodiments may include additional levels (L4, L5, etc.) of on-chip or off-chip in-line or lookaside cache, which may be fully inclusive, partially inclusive, or non-inclusive of the contents the upper levels of cache. Further, any of the various levels of the cache hierarchy may be private to a particular processor core 220 or shared by multiple processor cores 220. For example, in some implementations, the cache hierarchy includes L1 and L2 cache 228, 230 private to each processor core 220, with multiple of the L2 caches 230 sharing a common L3 victim cache 232.

FIG. 2B further illustrates some principal elements of L2 cache 230 and L3 cache 232 relevant to the embodiments described herein. In particular, L2 cache 230 includes a data array 240 for temporarily holding copies of data and instructions residing in system memory 108 and a directory 242 of the contents of data array 302. Assuming data array 240 and directory 242 are set associative as is conventional, memory locations in system memories 108 are mapped to particular congruence classes within data array 240 utilizing predetermined index bits within the system memory (real) addresses. The particular cache lines stored within data array 240 are recorded in directory 242, which contains one directory entry for each cache line. While not expressly depicted in FIG. 2B, it will be understood by those skilled in the art that each directory entry in directory 242 includes various fields, for example, a tag field that identifies the real address of the cache line held in the corresponding cache line of data array 240, a LRU (Least Recently Used) field indicating a replacement order for the cache line with respect to other cache lines in the same congruence class, inclusivity bits indicating whether the cache line is held in the associated L1 cache 228, and a state field that indicate the coherence state of the cache line. The coherency state indicates whether a valid copy of the cache line is present in data array 240 and if so, a level of read and/or write permission for the cache line. There are several well-known coherency protocols that can be employed including the Modified, Exclusive, Shared, Invalid (MESI) protocol and variants thereof. The technique of updating partial cache lines disclosed herein can be practiced with any coherence protocol capable of indicating exclusivity, namely, that only one cache currently holds a copy of a given cache line and that the copy is not modified relative to system memory 108.

L2 cache 230 also includes a store queue (STQ) 244 that receives and processes store requests received from the associated processor core 220 via core-to-L2 interface 227. For example, STQ 244 buffers and gathers the data of multiple store requests targeting the same cache line so that a single update to that cache line can be performed. STQ 244 is coupled to a merge buffer 246 that merges updates held by STQ 244 for a target cache line are merged with the current image of that cache line. In a conventional store operation, the current image of the cache line is retrieved from data array 240 (after retrieving it from the associated L3 cache 232, another cache 230 or 232, or system memory 108 if it was not already present in data array 240) and the specified update(s) is/are merged with the image and written back to data array 240.

L2 cache 230 further includes control logic (often referred to collectively as a cache controller) to manage the flow of data and coherence information to, from and within L2 cache 230. In the depicted embodiment, such control logic includes one or more Read-Claim (RC) machines 250 for independently and concurrently servicing load-type (LD), store-type (ST), a prefetch (PF) requests received from the affiliated processor core 220. RC machines 250 service such commands by, among other actions, retrieving data into L2 cache 230 and, if necessary, supplying data to processor core 220 via core-to-L2 interface 227.

As will be appreciated, the servicing of memory access requests by RC machines 250 may require the replacement or invalidation of cache lines within data array 240. Accordingly, L2 cache 230 includes one or more CO (castout) machines 252 that manage the eviction of cache lines from data array 240. Preferentially, valid cache lines are evicted to the associated L3 cache 232, but may also be transmitted to system memory 108.

L2 cache 230 further includes one or more SN (snoop) machines 254 responsible for monitoring ("snooping") commands on fabric interface 259, providing partial responses as necessary on the interconnect fabric, and updating L2 cache 230 as necessary to maintain cache coherency. In general, the partial responses indicate the coherence state of a target cache line of a command with respect to L2 cache 230 and whether and how it can service the snooped command. To process a snooped command, a SN machine 254, among other operations, may alter the entry in directory 242 for the target cache line, may provide a copy of the target cache line to a cache that issued the command, and may push a target cache line to system memory 108.

L2 cache 230 also has an L2-to-L3 interface that supports communication of commands and data from L2 cache 230 to L3 cache 232 and the return of data and status/coherence information from L3 cache 232 to L2 cache 230.

Like L2 cache 230, L3 cache 232 includes a data array 260 for temporarily holding copies of data and instructions residing in system memory 108 and a directory 242 of the contents of data array 302. Data array 260 and directory 262 are preferably structured similar to data array 240 and directory 242 of L2 cache 230, which are described above.

L3 cache 232 includes control logic (often referred to collectively as a cache controller) to manage the flow of data and coherence information to, from and within L2 cache 232. In the depicted embodiment, such control logic includes one or more RD (read) machines 270 responsible for returning data from L3 cache 232 to L2 cache 230. In general, load-type or store-type operations that miss in L2 cache 230 are forwarded to L3 cache 232. If the operation hits in L3 cache 232, the RD machine 270 returns a hit status to L2 cache 230 and forwards data to L2 cache 230 over L2-to-L3 interface 257.

L3 cache 232 further includes one or more SN (snoop) machines 274 responsible for monitoring ("snooping") commands on fabric interface 279, providing partial responses as necessary on the interconnect fabric, and updating L3 cache 232 as necessary to maintain cache coherency. In general, the partial responses indicate the coherence state of a target cache line of a command with respect to L3 cache 232 and whether and how it can service the snooped command. To process a snooped command, a SN machine 274, among other operations, may alter the entry in directory 262 for the target cache line, may provide a copy of the target cache line to a cache that issued the command, and may push a target cache line to system memory 108.

L3 cache 232 also contains one or more PF (prefetch) machines 272 utilized to prefetch data from system memory 108 into L3 cache 232. An L2 RC machine 250 can issue prefetch commands over the L2-to-L3 interface to instruct L3 cache 232 to prefetch data into L3 cache 232.

To process a normal read request generated by execution by LSU 225 of a load instruction, a lookup is performed to determine if L1 cache 228 holds a copy of the target cache line. If so, requested data from the target cache line is returned from L1 cache 228, and the read request is complete. If the target cache line is not present in L1 cache 228 (an L1 cache miss occurs), a read request is issued to L2 cache 230 over core-to-L2 interface 227. In response to receipt of the read request, an RC machine 250 determines if the target cache line is present in L2 cache 230. If so, the RC machine 250 returns data from the target cache line to processor core 220, which generally populates L1 cache 228 with the data and places the requested data into GPRF 226.

If the read request misses in L2 cache 230, the RC machine 250 consults L3 cache 232 via L2-to-L3 interface to determine if L3 cache 232 holds the target cache line. If so, a RD machine 270 returns the target cache line to L2 cache 230, which populates data array 240 (performing a castout of a cache line, if necessary, utilizing a CO machine 252) and directory 242. The RC machine 250 then returns the target cache line to processor core 220, which populates L1 cache 228 and places the requested data in GPRF 226.

Finally, if the target cache line of the read request is not present in L3 cache 232, L2 RC machine 250 issues a read command on the interconnect fabric to retrieve a copy of the target cache line either from another cache 230, 232 or from system memory 108. Coherency responses on the interconnect fabric indicate if the read command was successful, and if so, the source of the target cache line.

To process a normal store request generated by execution by LSU 225 of a store instruction, the processor core first determines if the target cache line is present in L1 cache 228. If so, the target cache line is updated in L1 cache 228, and the store request is forwarded to STQ 244 and then dispatched to a RC machine 250 for servicing. Data array 240 of L2 cache 230 is inclusive of the contents of L1 cache 228. Consequently, if the target cache line is present in L1 cache 228, data array 240 of L2 cache 230 also contains the target cache line and is accordingly updated by RC machine 250.

If the store request misses in L1 cache 228, processor core 220 forwards the store request to STQ 244 and then to an RC machine 250 for servicing. If the store request hits in L2 cache 230, the RC machine 250 updates L2 cache 230 with the store data. If the store request misses in L2 cache 230, the RC machine 250 first attempts to obtain the target cache line from L3 cache 232. If the target cache line is present in L3 cache 232, a RD machine 270 returns the target cache line to L2 cache 230, which populates which populates data array 240 (performing a castout of a cache line, if necessary, utilizing a CO machine 252) and directory 242.

If the target cache line is not present in L3 cache 232, the RC machine 250 issues a command on the interconnect fabric to retrieve a copy of the target cache line either from another cache 230, 232 or from system memory 108. Coherency responses on the interconnect fabric indicate if the read command was successful, and if so, the source of the target cache line. The RC machine then updates the target cache line in L2 cache 230 with the data received from processor core 220.

As can be seen from the foregoing, the processing of normal load and store requests entails the displacement and creation of full cache lines at various levels of the cache hierarchy. Typically, this behavior is advantageous due to the fact that recently referenced data is likely to be accessed again in the near future (temporal locality) or nearby data is likely to be referenced in the near future (spatial locality). However, when a workload does not exhibit spatial or temporal locality, retrieving full cache lines and populating L1 and L2 caches 228, 230 with these cache lines degrades performance. As appreciated herein, this performance degradation can be alleviated by prefetching partial cache lines from memory and placing them only in one lower level (e.g., L3) cache. Read and store requests that target the partial cache lines can then be serviced without polluting upper level caches (e.g., L1 and L2 caches 228, 230) with data not likely to again be accessed.

With reference now to FIG. 3, an exemplary format of one of the directory entries 300 in L3 directory 262 is depicted. In the depicted embodiment, directory entry 300 includes an address tag 308 that indicates the real address of the cache line present in data array 260 at the storage location corresponding to this directory entry 300. Directory entry 300 further includes valid bits. V0 302 and V1 304, which are used when a partial cache line resides in the corresponding storage location in data array 260 to indicate which half of the cache line is valid in L3 cache 232. Those skilled in the art will appreciate that with additional valid bits, it would be possible to separately indicate validity for smaller portions of the full cache line.

Directory entry 300 further includes a state field 306 that indicates the coherence state of the cache line in the corresponding storage location in data array 260. Table I below summarizes legal combinations of the states of valid bits 302, 304 and coherence states in one exemplary embodiment. In the illustrated embodiment, for efficiency and simplicity partial cache lines are only allowed to be present in L3 cache 232 in an exclusive state (among possibly multiple exclusive states in the coherence protocol). By maintaining partial cache lines in exclusive state(s) only, L3 cache 232 is able to immediately abandon the partial cache line when snooping a request for the full cache line since the partial cache line is not modified relative to system memory 108. As a further simplification, one preferred embodiment permits partial cache lines to be prefetched only from system memory 108. This simplification allows the cache coherence protocol to not have to support cache-to-cache intervention of partial cache lines.

TABLE I

| V0 | V1 | Coherence State |
|----|----|-----------------|
| 0  | 0  | Any legal state defined by the coherence protocol |
| 0  | 1  | Exclusive |
| 1  | 0  | Exclusive |
| 1  | 1  | Reserved |

Figure 4:
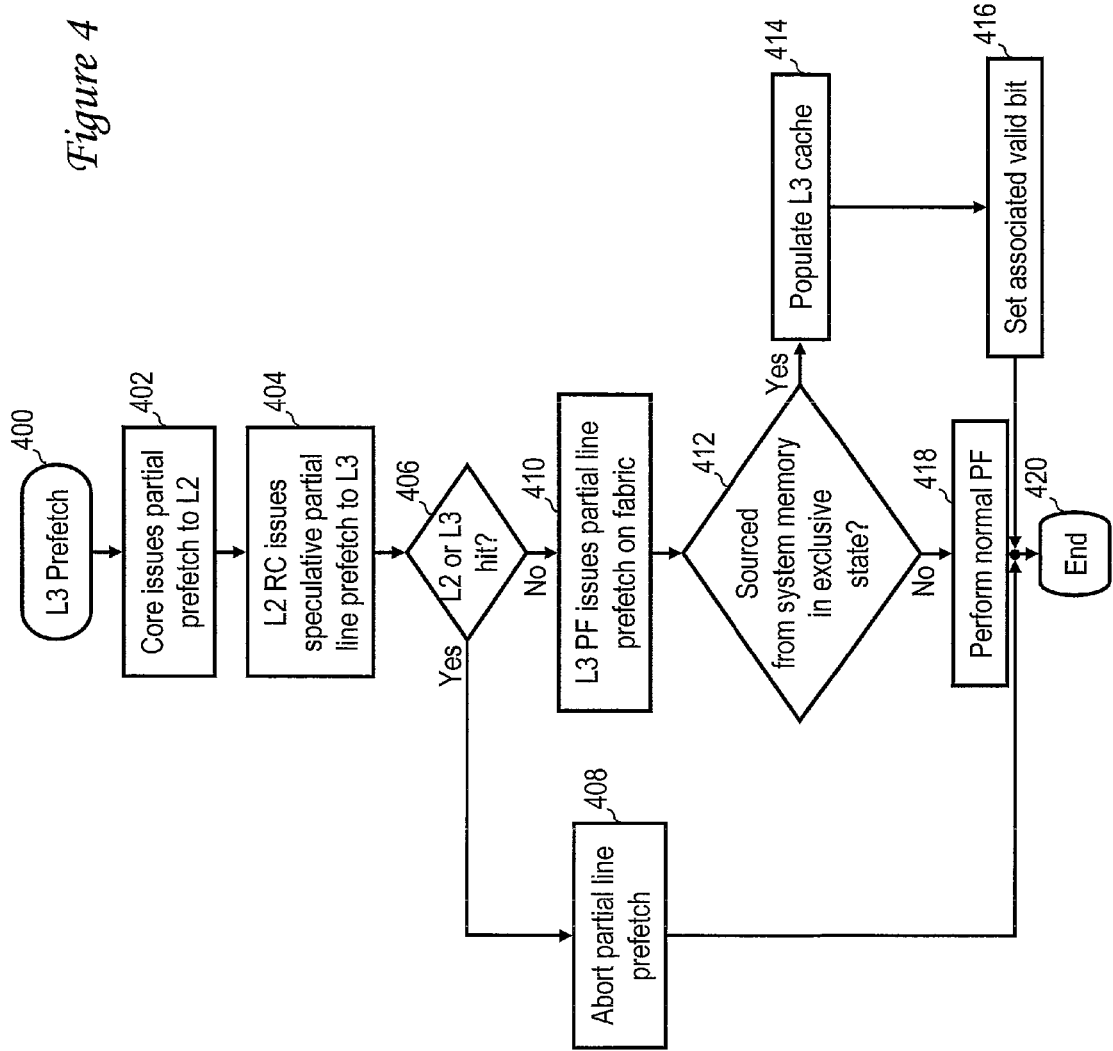
FIG. 4 is a high level logical flowchart of an exemplary process of prefetching partial cache line in one embodiment.

Referring now to FIG. 4, there is depicted a high level logical flowchart of an exemplary process of prefetching partial cache line in one embodiment. In the illustrated embodiment, a prefetched partial cache line is installed in a lower level cache (e.g., L3 cache 232), and subsequent read and store requests targeting the partial cache line can be processed without populating the upper level caches (e.g., L1 and L2 caches 228, 230) with all or a portion of the target cache line.

The process begins at block 400 and then proceeds to block 402, which depicts a processor core 220 issuing a partial line prefetch request to L2 cache 230. In response to the partial line prefetch request, L2 cache 230 dispatches a RC machine 250 to service the request. The RC machine 250 speculatively issues a partial line prefetch request to L3 cache 232 via L2-to-L3 interface 257 (block 404).

At block 406, each of L2 cache 230 and L3 cache 232 consults its respective directory and determines if the target cache line of the partial line prefetch request is present in either cache. For a partial cache line prefetch request, a hit is considered to occur if an L3 cache 232 contains either the full target cache line or the requested partial cache line or if an L2 cache 230 contains the full target cache line. If a cache hit is detected at block 406, the partial cache line prefetch request is aborted because the target cache line is already installed in the cache hierarchy (block 408). However, for workloads that utilize the partial cache line access techniques disclosed herein, hits at block 406 will be rare.

In response to a negative determination at block 406, the an PF machine 272 issues a partial cache line prefetch command on the interconnect fabric to obtain the target partial cache line from an IMC 206 (block 410). As described above, coherence responses from the various participants on the interconnect fabric determine the source of the partial cache line. At block 412, the PF machine 272 determines if the coherence response to the partial cache line prefetch command indicates the partial cache line was sourced from an IMC 206 in an exclusive coherence state. If so, the PF machine 272 installs the partial cache line in data array 260 of L3 cache 232 and sets coherence state field 306 and one of valid bits 302, 304 of the corresponding directory entry 300 as described above with reference to FIG. 3 and Table I (blocks 414 and 416). If, however, a negative determination is made at block 412, a normal full cache line prefetch command is instead performed (block 418). Following either of block 416 or block 418, the process completes at block 420.

Figure 5:
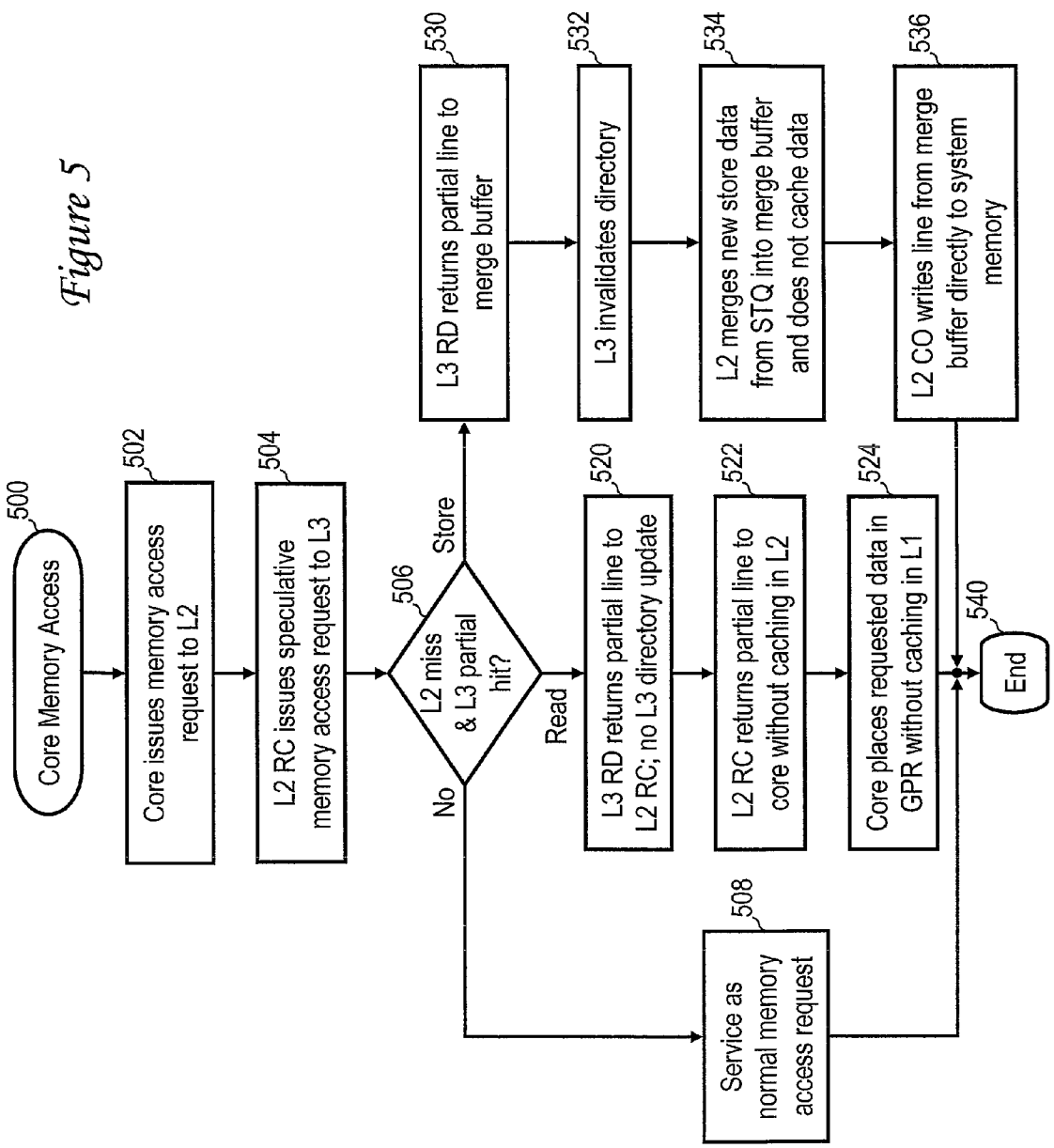
FIG. 5 is a high level logical flowchart of an exemplary process of servicing a core memory access request in one embodiment.

With reference now to FIG. 5, there is illustrated a high level logical flowchart of an exemplary process of servicing a core memory access request in one embodiment. The illustrated process begins at block 500, for example, with LSU 225 of a processor core 220 executing a memory access instruction, such as a load or store instruction. Following execution of the memory access instruction to determine the target real address of the memory access instruction and a determination that the memory access request cannot be serviced by the L1 cache 228, processor core 220 issues a memory access request to its L2 cache 230 via the core-to-L2 interface 227 (block 502). In response to receipt of the memory access request, an RC machine 250 is dispatched to service the memory access request. The RC machine 250 then speculatively issues the memory access command to L3 cache 232 via L2-to-L3 interface 257 (block 504).

The RC machine 250 then determines at block 506 whether the memory access request missed in L2 cache 230 and hit a partial cache line in L3 cache 232. If not, the memory access request is processed as a normal read or store request as described above. If, however, the RC machine 250 determines at block 506 that the memory access request missed in L2 cache 230 and hit a partial cache line in L3 cache 232, the memory access request is serviced as a partial cache line memory access request, as described below with reference to block 520-524 for partial cache line read requests and as described with reference to blocks 530-536 for partial cache line store requests.

Referring first to block 520, for a partial cache line read request, a RD machine 270 in L3 cache 232 returns the target partial cache line to the RC machine 250 of L2 cache 230 without any update to the corresponding directory entry 300 in L3 cache 232. In response to receipt of the target partial cache line, the RC machine 250 returns the target partial cache line data to the processor core 220 without populating data array 240 with the target partial cache line and without performing any update to directory 242 (block 522). In response to receipt of the target partial cache line, processor core 220 places data from the target partial cache line in GPRF 226 without caching the target partial cache line in L1 cache 228 or updating its directory (block 524). Thereafter, the process of FIG. 5 ends at block 540.

In this fashion, the partial cache line of data is returned to the requesting processor core 220 directly from L3 cache 232 to GPRF 226 without polluting the upper level caches with the partial cache line (e.g., L1 and L2 caches 228, 230). In many cases, the partial cache line read serves as the first part of an update of the target partial cache line. Once the partial cache line data is present in GPRF 226, the partial cache line data can be modified and manipulated as necessary or desired through the execution of one or more additional arithmetic or logical instructions by EUs 224.

Referring now to block 530, for a partial cache line store request, the RD machine 270 of L3 cache 232 returns the target partial cache line to the merge buffer 246. L3 cache 232 also invalidates the directory entry 300 corresponding to target partial cache line to release its copy of the partial cache line because the partial cache line store request completes a read-modify-write cycle used to update the partial cache line (block 532). In response to receipt of the partial cache line in merge buffer 246, L2 cache 230 merges the store data received from the processor core 220 in STQ 244 into merge buffer 246 without caching the partial cache line data (block 534). A CO machine 252 is then dispatched to write the updated partial cache line directly from merge buffer 246 into system memory 108, thus completing the update of the partial cache line without polluting the upper level caches with the partial cache line (e.g., L1 and L2caches 228, 230).

Figure 6:
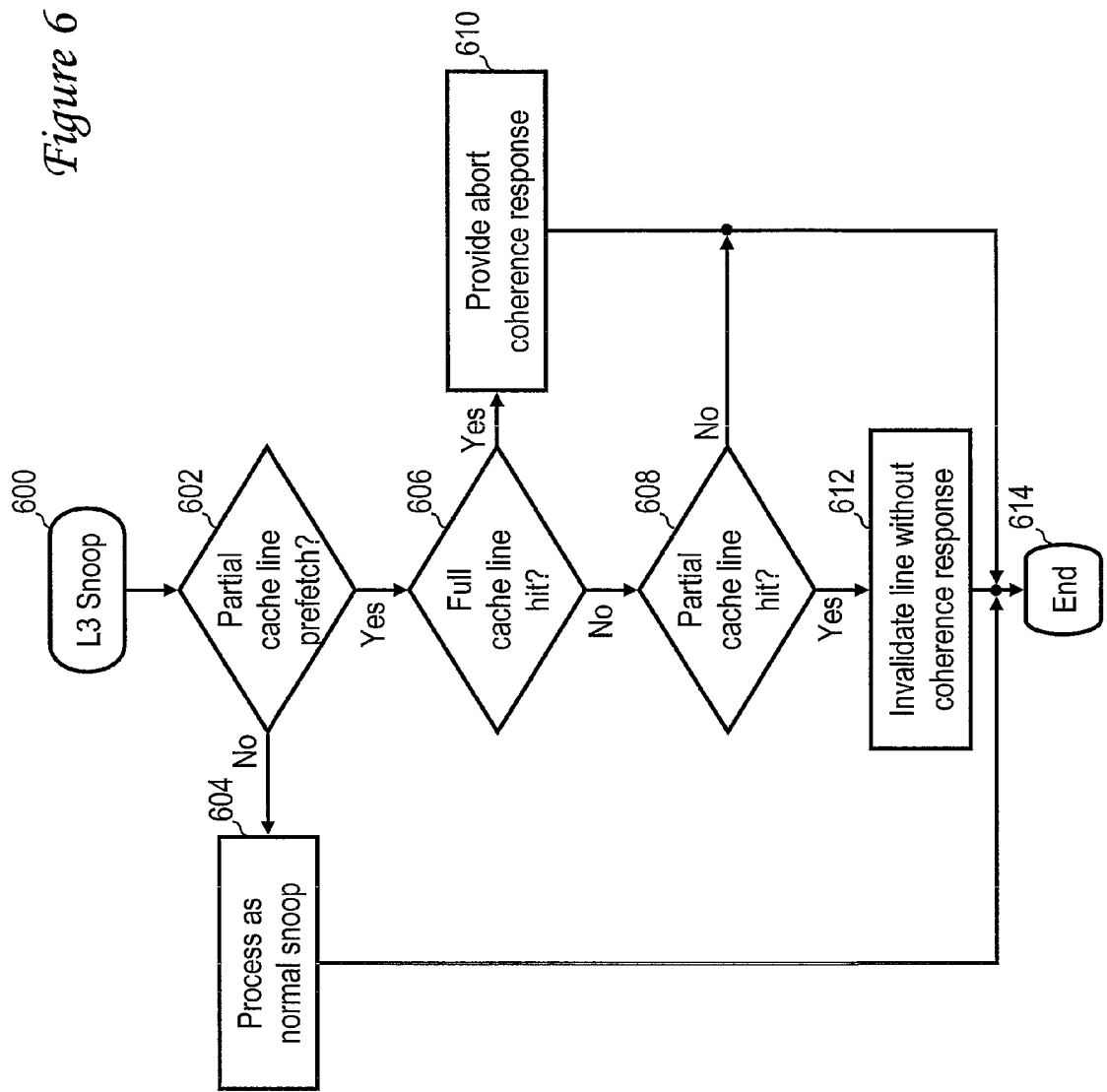
FIG. 6 is a high level logical flowchart of an exemplary process by which an L3 cache processes a snooped command on the interconnect fabric in one embodiment.

Referring now to FIG. 6, there is depicted a high level logical flowchart of an exemplary process by which an L3 cache 232 processes a snooped command on the interconnect fabric. It should be noted that an L3 cache 232 of the cache hierarchy initiating a command does not, in general, snoop a command on the interconnect fabric. Rather, the L3 directory 262 is consulted when a RC machine 250 passes a request to an L3 RD machine 270 and before the memory access command is placed on the interconnect fabric. Consequently, the process shown in FIG. 6 generally applies to L3 caches 232 other than the L3 cache 232 of the cache hierarchy that is the source of the command.

The process of FIG. 6 begins at block 600 in response to an L3 cache 232 sensing a command on the interconnect fabric in one embodiment. In response to receipt of the command, an L3 SN machine 274 is dispatched to service the snooped command, and the SN machine 274 determines if the snooped command is a partial cache line prefetch command (block 602). If not, the SN machine 274 services the snooped command in a conventional manner (block 604), and the process terminates at block 614.

If, one the other hand, the SN machine 274 determines at block 602 that the snooped command is a partial cache line prefetch command, SN machine 274 determines at blocks 606 and 608 whether or not the directory 262 indicates that the partial cache line prefetch command hits a partial or full cache line within L3 cache 232. If a determination is made at block 606 that partial cache line prefetch request hits a full cache line, a partial cache line prefetch from an IMC 206 is not possible, and SN machine 274 provides an abort coherence (partial) response that will cause the partial cache line prefetch command to be aborted (block 610). Thereafter, the process ends at block 614.

If SN machine 274 determines at block 608 that the partial cache line prefetch command did not result in a hit on a partial cache line, SN machine 274 provides no coherency response since its L3 cache 232 does not contain the target partial cache line. Consequently, the process simply terminates at block 614.

If, however, SN machine 274 determines at block 608 that partial cache line prefetch command resulted in a hit on a partial cache line, SN machine 274 invalidates its locally cached copy of the target partial cache line without providing a coherency response (block 612), thus permitting an WIC 206 to source the target partial cache line in an exclusive state. Exclusivity is guaranteed by the design of the coherence protocol because, if a snoop hit on a partial cache line occurs in an L3 cache 232, that L3 cache 232 is guaranteed to be the only cache in data processing system 100 to contain a full or partial copy of the target cache line. In this case, the snooping L3 cache 232 abandons its copy of the partial cache line to allow another L3 cache 232 to attempt to perform an update. Following block 612, the process shown in FIG. 6 ends at block 614.

Figure 7:
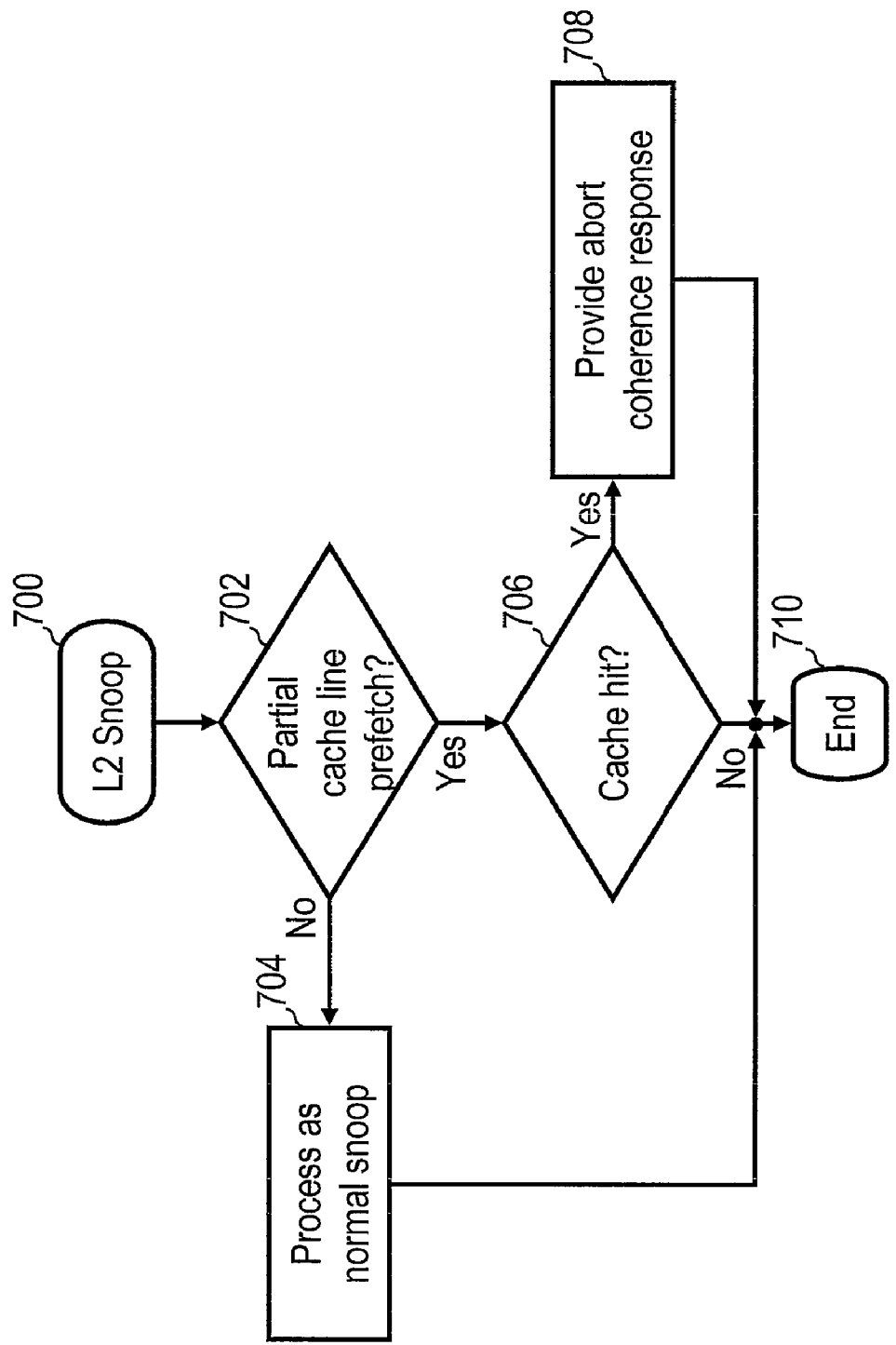
FIG. 7 a high level logical flowchart of an exemplary process by which an L2 cache processes a snooped command on the interconnect fabric in one embodiment.

With reference now to FIG. 7, there is illustrated a high level logical flowchart of an exemplary process by which an L2 cache 230 processes a snooped command on the interconnect fabric in one embodiment. As described above, an L2 cache 230 of the cache hierarchy initiating a command does not, in general, self-snoop a command on the interconnect fabric.

The process of FIG. 7 begins at block 700 in response to an L2 cache 230 sensing a command on the interconnect fabric. In response to receipt of the command, an L2 SN machine 254 is dispatched to service the snooped command, and the SN machine 254 determines if the snooped command is a partial cache line prefetch command (block 702). If not, the SN machine 274 services the snooped command in a conventional manner (block 704), and the process terminates at block 710.

If, one the other hand, the SN machine 254 determines at block 702 that the snooped command is a partial cache line prefetch command, SN machine 254 determines at block 706 whether or not the L2 directory 242 indicates that the partial cache line prefetch command results in a hit. If so, a partial cache line prefetch from an IMC 206 is not possible, and SN machine 254 accordingly provides an abort coherence (partial) response that will cause the partial cache line prefetch command to be aborted (block 708). Thereafter, the process ends at block 710.

Returning to block 706, if the SN machine 254 determines that the partial cache line prefetch command did not result in a hit in its L2 cache 230, SN machine 254 provides no coherency response since its L2 cache 230 does not contain the target cache line. Consequently, the process simply terminates at block 710.

As has been described, in one embodiment, a processing unit for a data processing system includes a processor core having one or more execution units for processing instructions and a register file for storing data accessed in processing of the instructions. The processing unit also includes a multi-level cache hierarchy coupled to and supporting the processor core. The multi-level cache hierarchy includes at least one upper level of cache memory having a lower access latency and at least one lower level of cache memory having a higher access latency. The lower level of cache memory, responsive to receipt of a memory access request that hits only a partial cache line in the lower level cache memory, sources the partial cache line to the at least one upper level cache memory to service the memory access request. The at least one upper level cache memory services the memory access request without caching the partial cache line.

If the memory access request is a read request, the at least one upper level cache memory services the read request by transmitting the partial cache line to the processor core. The processor core places data from the partial cache line in the register file without caching the partial cache line in the at least one upper level cache memory. If, on the other hand, the memory access request is a store request, the lower level cache memory invalidates its copy of the partial cache line, and the at least one upper level cache services the store request by merging store data from the processor core with the partial cache line to obtain an updated partial cache line and writing the updated partial cache line directly to system memory without caching the updated partial cache line in the at least one upper level cache memory or the lower level cache memory.

While the invention has been particularly shown and described with reference to one or more preferred embodiments, it will be understood by those skilled in the art that various changes in form and detail may be made therein without departing from the spirit and scope of the invention. Further, although aspects have been described with respect to a computer system executing program code that directs the functions of the present invention, it should be understood that present invention may alternatively be implemented as a program product including a storage medium storing program code that can be processed by a data processing system.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit for a data processing system, said processing unit comprising:
   a processor core including one or more execution units for processing instructions and a register file for storing data accessed in processing of the instructions; and
   a multi-level cache hierarchy coupled to and supporting the processor core, said multi-level cache hierarchy including at least one upper level of cache memory having a lower access latency and at least one lower level of cache memory having a higher access latency, wherein the lower level of cache memory, responsive to receipt of a memory access request that hits only a partial cache line in the lower level cache memory, sources the partial cache line to the at least one upper level cache memory to service the memory access request, and wherein the at least one upper level cache memory services the memory access request without caching the partial cache line.

2. The processing unit of claim 1, wherein the multi-level cache hierarchy issues a partial cache line prefetch command on an interconnect fabric of the data processing system to place the partial cache line exclusively in the lower level cache memory.

3. The processing unit of claim 1, wherein:
   the memory access request is a read request;
   the at least one upper level cache memory services the read request by transmitting the partial cache line to the processor core; and
   the processor core places data from the partial cache line in the register file without caching the partial cache line in the at least one upper level cache memory.

4. The processing unit of claim 1, wherein:
   the data processing system includes a system memory;
   the memory access request is a store request;
   the lower level cache memory invalidates its copy of the partial cache line; and
   the at least one upper level cache services the store request by merging store data from the processor core with the partial cache line to obtain an updated partial cache line and writing the updated partial cache line directly to the system memory without caching the updated partial cache line in the at least one upper level cache memory and without caching the updated partial cache line in the lower level cache memory.

5. The processing unit of claim 1, wherein the lower level cache memory sources the partial cache line to the at least one upper level cache memory only if the memory access request hits in the lower level cache memory and misses in the at least one upper level cache memory.

6. The processing unit of claim 1, wherein the lower level cache memory holds partial cache lines including the partial cache line only in an exclusive coherence state.

7. A data processing system, comprising:
   an interconnect fabric;
   at least one system memory coupled to the interconnect fabric; and
   a plurality of processing units, wherein a processing unit among the plurality of processing units includes:
      a processor core including one or more execution units for processing instructions and a register file for storing data accessed in processing of the instructions; and
      a multi-level cache hierarchy coupled to and supporting the processor core, said multi-level cache hierarchy including at least one upper level of cache memory having a lower access latency and at least one lower level of cache memory having a higher access latency, wherein the lower level of cache memory, responsive to receipt of a memory access request that hits only a partial cache line in the lower level cache memory, sources the partial cache line to the at least one upper level cache memory to service the memory access request, and wherein the at least one upper level cache memory services the memory access request without caching the partial cache line.

8. The data processing system of claim 7, wherein the multi-level cache hierarchy issues a partial cache line prefetch command on an interconnect fabric of the data processing system to place the partial cache line exclusively in the lower level cache memory.

9. The data processing system of claim 7, wherein:
   the memory access request is a read request;
   the at least one upper level cache memory services the read request by transmitting the partial cache line to the processor core; and
   the processor core places data from the partial cache line in the register file without caching the partial cache line in the at least one upper level cache memory.

10. The data processing system of claim 7, wherein:
the data processing system includes a system memory;
the memory access request is a store request;
the lower level cache memory invalidates its copy of the partial cache line; and
the at least one upper level cache services the store request by merging store data from the processor core with the partial cache line to obtain an updated partial cache line and writing the updated partial cache line directly to the system memory without caching the updated partial cache line in the at least one upper level cache memory and without caching the updated partial cache line in the lower level cache memory.

11. The data processing system of claim 7, wherein the lower level cache memory sources the partial cache line to the at least one upper level cache memory only if the memory access request hits in the lower level cache memory and misses in the at least one upper level cache memory.

12. The data processing system of claim 7, wherein the lower level cache memory holds partial cache lines including the partial cache line only in an exclusive coherence state.

13. A method of data processing in a processing unit of a data processing system, the processing unit including a processor core and a multi-level cache hierarchy coupled to and supporting the processor core, said multi-level cache hierarchy including at least one upper level of cache memory having a lower access latency and at least one lower level of cache memory having a higher access latency, said method comprising:
the processor core sending a memory access request to the lower level cache memory;
the lower level cache, responsive to determining that the memory access request hits only a partial cache line in the lower level cache memory, sourcing the partial cache line to the at least one upper level cache memory to service the memory access request; and
the at least one upper level cache memory, responsive to receiving the partial cache line from the lower level cache memory, servicing the memory access request without caching the partial cache line.

14. The method of claim 13, and further comprising the multi-level cache hierarchy issuing a partial cache line prefetch command on an interconnect fabric of the data processing system to place the partial cache line exclusively in the lower level cache memory.

15. The method of claim 13, wherein:
the memory access request is a read request;
servicing the memory access request includes the at least one upper level cache memory transmitting the partial cache line to the processor core; and
the method further comprises the processor core placing data from the partial cache line in a register file of the processor core without caching the partial cache line in the at least one upper level cache memory.

16. The method of claim 13, wherein:
the data processing system includes a system memory;
the memory access request is a store request;
the method further comprises the lower level cache memory invalidating its copy of the partial cache line; and
said servicing comprises the at least one upper level cache memory servicing the store request by merging store data from the processor core with the partial cache line to obtain an updated partial cache line and by writing the updated partial cache line directly to the system memory without caching the updated partial cache line in the at least one upper level cache memory and without caching the updated partial cache line in the lower level cache memory.

17. The method of claim 13, wherein the sourcing comprises the lower level cache memory sourcing the partial cache line to the at least one upper level cache memory only if the memory access request hits in the lower level cache memory and misses in the at least one upper level cache memory.

* * * * *